Patented Aug. 23, 1927.

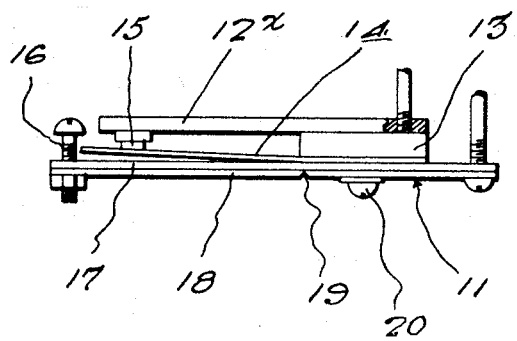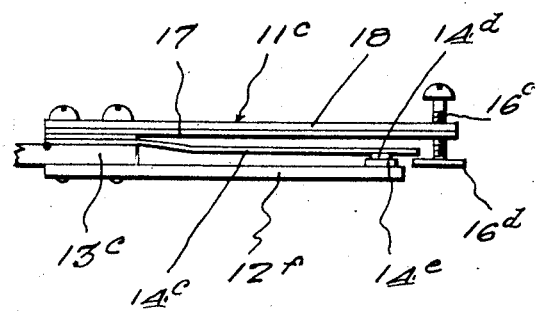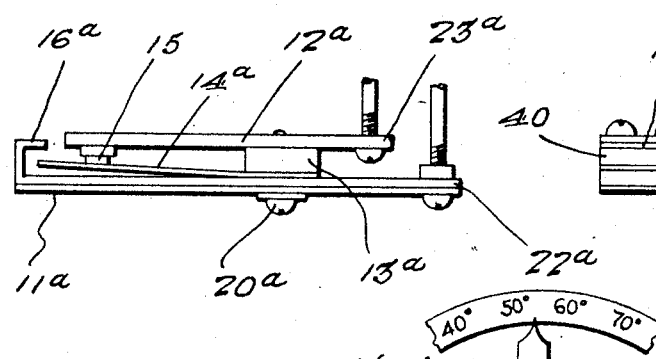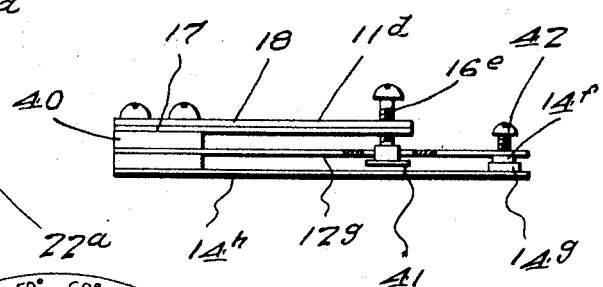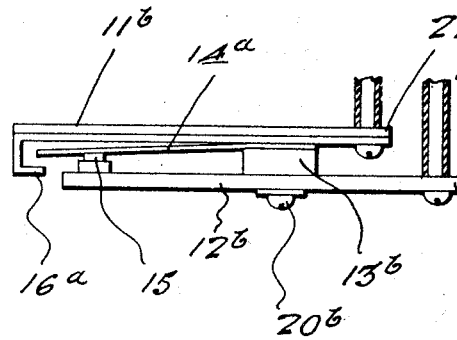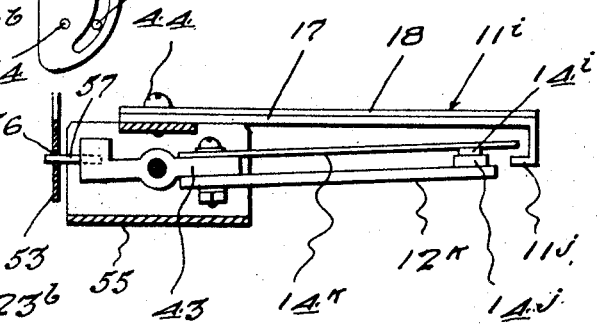

1,640,257

UNITED STATES PATENT OFFICE.

EMIL STRANSZKY, OF WARREN, PENNSYLVANIA, ASSIGNOR TO FRANK B. RAE, JR., AND E. G. K. MEISTER, BOTH OF CLEVELAND, OHIO.

THERMOSTATIC SWITCH.

Original application filed December 8, 1921, Serial No. 520,970. Divided and this application filed October 21, 1922. Serial No. 596,087.

The object of my said invention is the provision of a thermostatic switch, simple in construction and positive and reliable in action and designed to be used to advantage in electric irons and heating appliances and electric water heaters, and for controlling gas, steam valves, and refrigerators and the temperature of apartments and the like.

To the attainment of the foregoing, the invention consists in the improvement as hereinafter described and definitely claimed.

In the accompanying drawings, forming part of this specification:—

Figure 1 is a view of a thermostatic switch constructed in accordance with my invention and designed more particularly for use in the electrically-heated flat iron constituting the subject of my contemporary application filed December 8, 1921, Serial No. 520,970 from which said switch is divided as an invention separate from the iron.

Figures 2 and 3 are views of modified switches also divided from said identified application.

Figures 4, 5, 6 and 7 are views of other modified switches constructed in accordance with my invention.

For convenience in description reference will first be made to Figure 1.

The thermostatic switch illustrated in Figure 1 and which I have successfully used in actual practice is made up of a bar 11, a bar 12ˣ spaced from the bar 11, a body of insulating material 13 interposed between and connected with the bars 11 and 12ˣ, a thin metallic strip 14 superimposed on the bar 11 and also connected with the body of insulation 13, a contact protuberance 15 at the underside of the free portion of the bar 12ˣ, and a screw 16 adjustably connected with the free portion of the bar 11 and having a head adapted to engage the free end of the thin strip 14 and cooperate therewith for a purpose hereinafter set forth. At this point I would have it understood that the bar 11 is composed of two metals 17 and 18 one of which is less amenable to the action of heat than the other, this in order to render the bar more prompt in action; also, that the lower member 18 is transversely kerfed at its underside as indicated by 19 so that strain is taken off the connecting screw 20 incident to bending of the bar 11. The thin strip 14 is possessed of resiliency, and is normally arranged against the contact protuberance 15, it being understood in this connection that the bars 11 and 12ˣ are interposed between and electrically connected with the heating element such as a resistance coil and a source of electric energy. With this understanding, it will be further understood that when the bar 11 is subjected to the action of heat to a predetermined extent, the said heat will have the effect of causing the free portion of the bar 11 to move away from the free portion of the bar 12ˣ so that the head of the screw 16 will engage and draw the strip 14 out of contact with the protuberance 15. In this way the supply of current to the heating element alluded to will be cut off until the temperature of the thing heated by the heating element is reduced to a predetermined extent when the bar 11 will be restored to its normal state, and incident to such restoration the strip 14 will be carried against the protuberance 15 and the supply of current to the referred to heating element will be reestablished. From this it follows that by novel thermostatic switch when used in the iron of my identified contemporary application will reliably maintain the temperature of the ironing surface of the iron at a uniform degree so that the iron will operate efficiently, and yet there will be no liability of the said ironing surface being unduly heated so that the fabric being ironed will be scorched.

The thermostatic switches shown in Figures 2 and 3 lack the screw 16 before described. In lieu of the said screw 16 the bar 11ᵃ in each of the said switches has at its free end a hook 16ᵃ which is designed to cooperate with the strip 14ᵃ in the same manner that the head of the screw 16 cooperates with the thin strip 14. It will also be noted by particular reference to Figure 2 that the bars 11ᵃ and 12ᵃ have terminals 22ᵃ and 23ᵃ arranged as shown relative to a body of insulation 13ᵃ, and that the said bars 11ᵃ and 12ᵃ are connected together though insulated from each other at 20ᵃ.

The thermostatic switch in Figure 3 has the bar 11ᵇ arranged above the bar 12ᵇ, and the insulation body 13ᵇ and the terminals 22ᵇ and 23$^b$ are arranged as illustrated as is also the connecting means 20$^b$. It will be understood, however, that the operation of each of the modifications in Figures 2 and 3 is generally similar to the operation of the embodiment shown in Figure 1 and that the modifications are possessed of all of the practical advantages hereinbefore ascribed to the embodiment in Figure 1.

The embodiment shown in Figure 4 is substantially the same construction as in Figure 1 but in inverted position, the bar 11$^c$ being arranged above instead of below the bar 12$^x$ and being devoid of the kerf 19, Figure 1, as are also the bars 11$^a$ and 11$^b$ of Figures 2 and 3, respectively. Said bar 11$^c$, however, is composed of two metals 17 and 18 one of which is less amenable to the action of heat than the other in order to render the bar more prompt in action. It will be noted, however, in respect to Figure 4 that in lieu of using the head of the adjustable screw 16$^c$ to engage the thin strip 14$^c$ and separate the contact 14$^d$ thereon from the contact 14$^e$ on the bar 12$^f$, the screw 16$^c$ is equipped for the purpose with an enlargement 16$^d$. The bar 11$^c$ works upwardly for the separation of the contacts 14$^d$ and 14$^e$. The bar 11$^c$, the strip 14$^c$ and the bar 12$^f$ are connected to insulating material 13$^c$, and the heel portions of the bar 11$^c$ and the thin strip 14$^c$ are also insulated from each other as shown.

In the modification shown in Figure 5, the thermostatic bar—i. e., the bar which opens and closes the circuit is designated by 11$^d$ and is of the same construction as the bar 11$^c$ in the respect of including the two metals 17 and 18 one of which is less amenable to the action of heat than the other. The said bar 11$^d$ is insulated at 40 from the switch and is arranged on downward movement to open the circuit. The advantage peculiar to this construction resides in the fact that the contacts 14$^f$ and 14$^g$ can be separated more quickly than in the construction shown in Figure 4 for the reason that the said thermostatic bar can act against resilient strip 14$^h$ at any convenient point, the screw 16$^e$ of the bar 11$^d$ being provided with a shoe 41 to engage the thin resilient strip 14$^h$ and being arranged to work through an opening in the bar 12$^g$. A set screw 42 is employed on one of the contacts—i. e., the contact 14$^f$ to put more tension on the switch, said screw being threaded through strip 12$^g$ and connected to contact 14$^f$.

In the embodiment shown in Figure 6 the adjustment is made on the switch as a unit by moving the switch closer to or farther from the thermostatic bar 11$^i$, the said bar 11$^i$ being formed of two metals 17 and 18 one of which is less amenable to the action of heat than the other and being provided with a hook 11$^j$ preferably of insulating material. The switch contacts 14$^i$ and 14$^j$ are carried by a thin resilient strip 14$^k$ and a bar 12$^k$, respectively, and the said strip and bar are carried by a lever member 43, preferably of insulating material. The thermostatic bar 11$^i$ is solidly fastened at 44, and the switch portions are separately mounted as stated so that by adjusting the lever member 43 and adjustably fixing the same the free end of the thin strip 14$^k$ can be positioned at various distances from the hook 11$^j$. This thermostatic switch is susceptible of use to advantage for closing and opening an electric circuit complementary to a refrigerating system, and I prefer to adjust and adjustably fix the lever member 43 through the medium of the handle-pointer 53, Figures 6 and 7, fulcrumed on a pin 54 carried by support 55, and having an irregular slot 56 that receives a heel pin 57 on the lever member 43. The handle pointer is by preference relatively arranged as shown to an arcuate scale 58, Figure 7, so that the extent of adjustment can be readily determined.

Manifestly my novel switch can be used in any position to suit different conditions. I would also have it understood that in using the thermostatic switch in a direct current I connect a condenser in proper relation across the contacts in order to reduce the arc when the circuit is open. I have deemed it unnecessary, however, to illustrate the condenser and the connection thereof herein.

Having described my invention, what I claim and desire to secure by Letters-Patent, is:—

A switch of the class described including a stationary support, a thermostatic bar formed of two metals, one of which is less amenable to the action of heat than the other, a hook depending from the outer end of said bar, a lever member pivotally mounted on the support beneath the thermostatic bar, a second bar detachably secured to the under side of the lever at one end thereof, a resilient strip detachably secured to the opposite side of the bar and insulated therefrom, and both said bar and strip having engaging contacts at the outer end, the outer end of said strip being positioned in the path of said hook, and a heel pin connected with the other end of the said lever connecting the lever member with a hand-pointer.

In testimony whereof I affix my signature.
EMIL STRANSZKY.